(12) United States Patent
Hou

(10) Patent No.: US 7,720,299 B2
(45) Date of Patent: May 18, 2010

(54) COMPRESSED DATA MULTIPLE DESCRIPTION TRANSMISSION AND RESOLUTION CONVERSION SYSTEM

(75) Inventor: Hsieh S. Hou, Rancho Palos Verdes, CA (US)

(73) Assignee: The Aerospace Corporation, El Segundo, CA (US)

( * ) Notice: Subject to any disclaimer, the term of this patent is extended or adjusted under 35 U.S.C. 154(b) by 1183 days.

(21) Appl. No.: 11/126,705

(22) Filed: May 10, 2005

(65) Prior Publication Data

US 2006/0257036 A1     Nov. 16, 2006

(51) Int. Cl.
G06K 9/46      (2006.01)
H04N 7/12      (2006.01)
H04N 11/02     (2006.01)
H04N 11/04     (2006.01)
G06F 17/14     (2006.01)

(52) U.S. Cl. .................. 382/250; 348/395.1; 348/403.1; 358/426.01; 708/402

(58) Field of Classification Search ......... 382/248–250; 348/395.1, 403.1–408.1; 358/426.01–426.16; 708/402
See application file for complete search history.

(56) References Cited

U.S. PATENT DOCUMENTS 6,058,215 A * 5/2000 Schwartz et al. ............ 382/244
7,437,394 B2 * 10/2008 Hou ........................... 708/402
2003/0236808 A1 * 12/2003 Hou ........................... 708/400
2003/0236809 A1 * 12/2003 Hou ........................... 708/400

* cited by examiner

Primary Examiner—Aaron W Carter
(74) Attorney, Agent, or Firm—Ocean Law; Paul D. Chancellor

(57) ABSTRACT

A system provides lossless split and merge processes of integer discrete cosine transform (DCT) transformed data such that the discrete cosine transform of one data block may be split into two half length DCT odd and even blocks for merging, with split and merge processes being lossless and are generated in the discrete cosine transformed domain. After splitting, the redundancy existing between the two integer discrete cosine transformed half data blocks allows one to approximately reconstruct the original data block in case one of the discrete cosine transformed half data block is lost during transmission. The system may be used with existing JPEG and MPEG compressors and decompressors because both use the discrete cosine transform for image and video compression and decompression, may be used as a resolution conversion device for transcribing from digital high-definition TV to analog low-definition TV, and may be used for lossless splitting and merging type-IV discrete cosine transformed data for audio compression and decompression in the international standard MPEG-4 Advanced Audio Coding (AAC), such as AC-3 or MP3.

17 Claims, 5 Drawing Sheets

MULTIPLE DESCRIPTION TRANSFORMED DATA SELECTOR

DCT TYPE II ROTATOR

EVEN AND ODD TRANSFORM PROCESSOR

FIG. 3

PROCESSING UNIT IMPLEMENTATION

FIG. 4

MULTIPLE DESCRIPTION TRANSFORMED DATA SELECTOR

FIG. 5

COMPRESSED DATA MULTIPLE DESCRIPTION TRANSMISSION AND RESOLUTION CONVERSION SYSTEM

STATEMENT OF GOVERNMENT INTEREST

The invention was made with Government support under contract No. F04701-00-C-0009 by the Department of the Air Force. The Government has certain rights in the invention.

REFERENCE TO RELATED APPLICATION

The present application is one of several related copending applications, all of which are by the same inventor, Dr. Hsieh Hou: MERGE AND SPLIT DISCRETE COSINE BLOCK TRANSFORM METHOD, patent application Ser. No. 10/175,594 filed Jun. 19, 2002, now U.S. Pat. No. 7,437,394; HAAR WAVELET TRANSFORM EMBEDDED LOSSLESS TYPE IV DISCRETE COSINE TRANSFORM, patent application Ser. No. 11/168,977, filed Jun. 27, 2005; SHARED HAAR WAVELET TRANSFORM, patent application Ser. No. 11/168,979, filed Jun. 27, 2005; HAAR WAVELET TRANSFORM EMBEDDED LOSSLESS TYPE II DISCRETE COSINE TRANSFORM, patent application Ser. No. 11/168,978, filed Jun. 27, 2005, now U.S. Pat. No. 7,613,761; and, EXTENDED HAAR TRANSFORM, patent application Ser. No. 11/168,981, filed Jun. 27, 2005.

FIELD OF THE INVENTION

The invention relates to the field of discrete cosine transforms. More particularly, the present invention relates the use of merge and split function in discrete cosine transform for data compression.

BACKGROUND OF THE INVENTION

A fast recursive algorithm for computing the discrete cosine transform can be used for image data compression that is useful in compressing data for either data storage for saving storage space or for data communications for saving communication channel bandwidth. During the calculation of the discrete cosine transform the DCT algorithm separates and combines data. A Radix-2 DCT separate block process and a Radix-2 DCT combine block process have been used to separate and combine data blocks. This DCT does not enable one to directly merge two equal sized transforms into one double size transform, nor to split double size transform whole. Equal splitting and merging is desirable for communicating transformed packets in smaller divisible packets. However, the DCT is not a true merge and split transformation process. The DCT data have been quantized into integers for converting into binary codes and causing data loss. When the DCT is used to split or merge there is a lossy transformation as there is no teachings known to form a mirror DCT transform that offer lossless transformation. A problem with the DCT transform is that the DCT can only perform a merge process by inversely transforming two equal sized DCT transforms back into the time domain, and then merge in the time domain, and finally forward transform the combined double size block into a double size DCT transform. This disadvantageously required additional inverse transformations and forward transformations prior to transmission that degrades the transformed data when repetively inverse and forward transforming the data. Hence, the DCT is not a true direct split or merge transform. Another problem with this discrete cosine transform is that there is no decimation-in-time DCT combine flow process compatible with the DCT decimation-in-time separate flow process. In prior art the T(N/2), type-II DCT and D(N/2) type-IV DCT blocks are DCT transforms of equal sized blocks processing first and second halves of the input data prior to combining the two halves into a double size type-II DCT output. The separate transform of prior art operates on first and second half inputs but the data is transformed into odd and even type-II DCT halves, incompatible with true merge and split transform processing. During the separate transformation processing of prior art the first and second half data are firstly subject to add and subtract processing prior to transformation, that is, separate combinational processing precedes the forward transformations. Another disadvantage of type-II and type-IV DCTs is that the separate and combine processes are always incurred with loss of data integrity. The type-II DCT are lossy separate and combine processes. Improved type-II and type-IV DCT provide lossy split and merge processes where the splitting and merging are mutually compatible for true splitting and merging of transform data in the transform domain, but disadvantageously provide lossy transformations.

A 2×2 rotator, whether lossy or lossless, has two bit-parallel serial word inputs $X_1$ and $X_2$ that are rotated in radians into two outputs $Y_1$ and $Y_2$. The first output of the 2×2 rotator is the first input weighted by the cosine of the rotating angle adding to the second input weighted by the sine of the same rotating angle. The second output of a 2×2 rotator is the first input weighted by the sine of the same rotating angle subtracted from the second input weighted by the cosine of the same rotating angle. That is, $Y_1 = \cos\theta X_1 + \sin\theta X_2$ and $Y_2 = -\sin\theta X_1 + \cos\theta X_2$. An integer lossy 2×2 rotator has two integer outputs for two integer inputs. An integer lossy 2×2 rotator has been implemented using traditional lifting stages. The unweighted input in each lifting stage is always used for addition but not for subtraction. Rotators have been used in DCT transforms. Rounding errors cannot be cancelled during continuous use of additions in lifting stages. The total rounding error of the traditional lifting method used in prior arts is very large because the accumulation of rounding errors throughout lifting stages. As such, the use of traditional lifting method produces lossy rotators.

The progressive transmission of compressed data works well when the data packets are sent and received without any error or loss. But when a packet is lost, the long delay in receiving a retransmitted packet often causes stalls in the whole decompression process. To improve the data integrity in unreliable channels, the original data stream has been split and sent on two separate links. Early multiple description speech coding processes separate the data into even and odd parts, and compress and communicate the even and odd parts over two independent paths. However, there are two drawbacks in multiple description methods. A first disadvantage is the use of separate compression and decompression hardware with the use of two independent channels. A second disadvantage is the respective inefficient compression of even and odd parts of data because the correlation between adjacent data samples in each part has been decreased. Recent multiple description methods add redundancies to the two halves of compressed data. The method of adding statistical dependencies to each channel can be used to estimate the loss of description. However, the method of adding statistical dependencies is not a real-time operation. Statistical data are needed to generate the multiple description transform in real time. The derived benefit of multiple descriptions may not be able to justify the additional complexity.

Another problem associated with transmitting DCT compressed data using unreliable communication links is the unreliable reconstruction of the compressed image after reception. Compressed still images or compressed video frames are to be transmitted over unreliable links. When one of the communication links is functional but the remaining communication links are corrupted, the existing DCT reconstruction disadvantageously poorly reconstructs the low-resolution version of the original image. When more links are functional, the reconstructed image quality could be improved at the cost of adding addition communication channels. Another problem with DCT transform communications is the incompatibility of receiver resolution. When a digital high-definition TV picture is transmitted to receivers, a conventional analog TV receiver must first decompress the high-definition picture signal prior to performing resolution down conversion for display. A low-resolution down conversion of compressed data has a less amount of data and save processing power and can be used to display an image on a low-resolution display but suffers from having to first decompress the high-resolution data before displaying the low-resolution data. These and other disadvantages are solved or reduced using the invention.

SUMMARY OF THE INVENTION

An object of the invention is to provide merging and splitting DCT transform data in the transform domain.

An object of the invention is to provide merging and splitting DCT type-II and type-IV transform data in the transform domain.

An object of the invention is to provide lossless merging and splitting DCT type-II and type-IV transform data in the transform domain.

An object of the invention is to provide lossless merging and splitting DCT type-II and type-IV transform data by decimation in time in the transform domain.

Another object of the invention is to provide lossless merging and splitting of compressed high-resolution transform data for communicating high and low compressed transform data over separate communications channels.

Still another object of the invention is to provide lossless merging and splitting of compressed high-resolution transform data for communicating high and low compressed transform data over separate communications channels for decompressing the low-resolution data independently of receiving the high compressed transform data for providing a low-resolution image.

The invention is directed to a system for transforming and compressing data for communication or storage of the compressed data using lossless merge and split DCT transform data. The DCT transform data can be either DCT type-II or type-IV DCT transform data. In a first aspect of the invention, input DCT transform data is first split into odd and even DCT transform data halves. The two transform data halves can then be communicated over respective communication channels. The two transform data halves can then be merged using an inverse DCT rotator in the transform domain for providing lossless merged high-resolution DCT transform data. In a second aspect of the invention, the odd and even DCT transform data halves can be merged when both of the odd and even transform data halves are received for providing the merged high-resolution DCT transform data. One of the odd or even DCT transform data halves can be inversely rotated for providing low-resolution DCT transform data preferably when one of the communication channels is corrupted. As such, a high-resolution display could display low-resolution data when one of the two communication channels is corrupted. The system enables the selection of low-resolution DCT transform data for displaying on a low-resolution display a low-resolution image independent when either one of the DCT transform data halves is received. The system enables the generation of high-resolution transform data when both DCT transform data halves are received, and enables the generation of low-resolution transform data when either one of the DCT transform data halves are received.

The system can be implemented as additions to existing JPEG and MPEG compressors, decompressors and communications systems for preferred use during multimedia transmission over wireless communication links. A real-time system can be used generating multiple descriptions of JPEG and MPEG compressed data over unreliable communication links. In addition, the system may be used for resolution down conversion from HDTV to conventional TV systems. These and other advantages will become more apparent from the following detailed description of the preferred embodiment.

DETAILED DESCRIPTION OF THE PREFERRED EMBODIMENT

Figure 1:
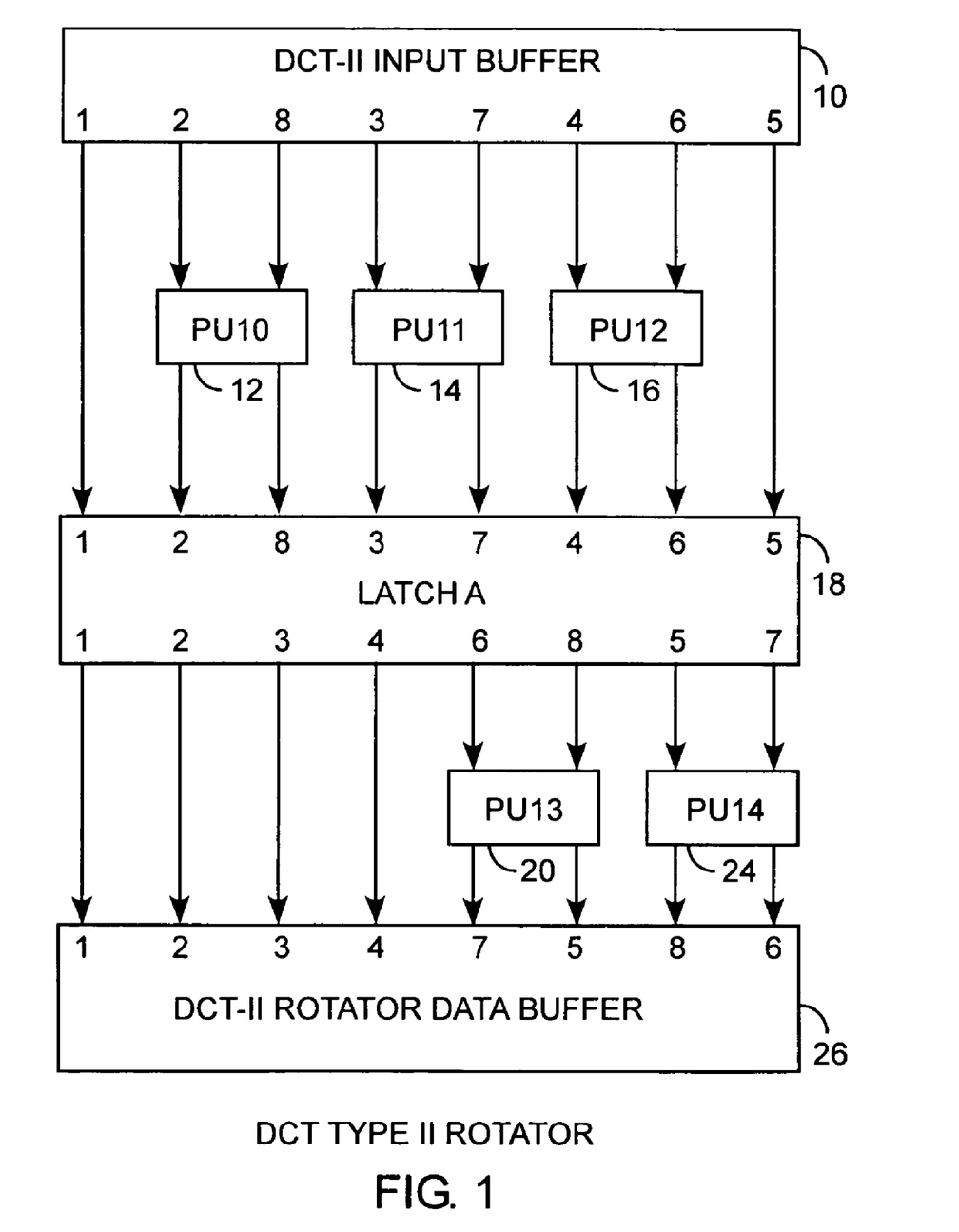
FIG. 1 is a block diagram of DCT type II rotator.

An embodiment of the invention is described with reference to the figures using reference designations as shown in the figures. Referring to FIG. 1, an input set of eight integer samples from the DCT-II input buffer 10 is DCT-II transformed and quantized data. DCT data words two and eight are sent to processing unit PU10 12, DCT data words three and seven are sent to processing unit PU11 14, and DCT data words four and six to processing unit PU12 16. The processing units, PU10, PU11, and PU12 are 2×2 lossless rotators. A 2×2 lossless rotator has two integer outputs for two integer inputs. A 2×2 rotator can be lossy or lossless. The first output is the first input weighted by the cosine of a rotating angle adding to the second input weighted by the sine of the same rotating angle. The second output is the first input weighted by the sine of the same rotating angle subtracted from the second input weighted by the cosine of the same rotating angle. The 2×2 lossless rotator comprises of three integer-to-integer lifting stages. Referring to PU10 12, for example, the inputs to the first lifting stage are DCT data words two and eight that are integers. The first input to the first lifting stage, DCT data words two is passed on to the first output of the first lifting stage without change. The second output of the first lifting stage is the second input, DCT data word, adding to the integer round off of the weighted first input. The weighting constant w is defined as one minus the sine of rotating angle divided by the cosine of the same rotating angle. The inputs to the second lifting stage are the outputs from the first lifting stage. The second input to the second lifting stage is passed to the second output of the second lifting stage without change. The first output of the second lifting stage is the integer round off of the weighted second input subtracting the first input. The weighting constant is the cosine of the rotating angle. The inputs to the third lifting stage are the outputs from the second lifting stage. The first input to the third lifting stage is passed to the second output of the third lifting stage without change.

The first output of the third lifting stage is the second input subtracting the integer round off of the weighted first input. The weighting constant w is defined as one minus the sine of rotating angle divided by the cosine of the same rotating angle. Both of the lossless 2×2 rotators, PU11 14 and PU12 16 have the same integer-to-integer three lifting stages as PU10 12 except that each of the processing units PU10 12, PU11 14, and PU12 16 has a unique rotating angle. The rotating angle of PU10 12 is π/16, PU11 14 is π/8, and PU12 16 is 3π/16 for π=3.14159 radians. The rotated outputs from PU10 12, PU11 14, and PU12 16, and the DCT data words one and five from the DCT-II input buffer 10 are latched on by latch A 18. The latch A 18 serves to permute input words to latched words by mere wire routing. The latch output words six and eight are sent to processing unit PU13 20, and the latch output words five and seven to processing unit PU14 24. Both processing units PU13 20 and PU14 24 are lossless 2×2 rotators that have the same integer-to-integer three lifting stages as PU11 14. The rotating angles of PU13 20 and PU14 24 are both π/8 radians. The rotated outputs from PU13 20 are sent to the DCT-II rotator data buffer 26 as input words seven and five. The rotated outputs from PU14 24 are sent to the DCT-II rotator data buffer 26 as input words eight and six. The output words one, two, three and four from latch A 18 are sent directly without further rotations to the DCT-11 rotator data buffer 26 as input words one, two, three, and four.

The weights that are used for multiplication of inputs in an integer-to-integer three stage lifting lossless 2×2 rotator may be replaced by shift and add operations on the binary digits of the inputs to each lifting stage. For binary shifts and adds, the weights, sine and cosine of rotating angles, are given by the canonic signed digit codes of $\sin(\pi/16)$, $\cos(\pi/16)$, $\sin(\pi/8)$, $\cos(\pi/8)$, $\sin(3\pi/16)$, and $\cos(3\pi/16)$ with π=3.14159.

Figure 2:
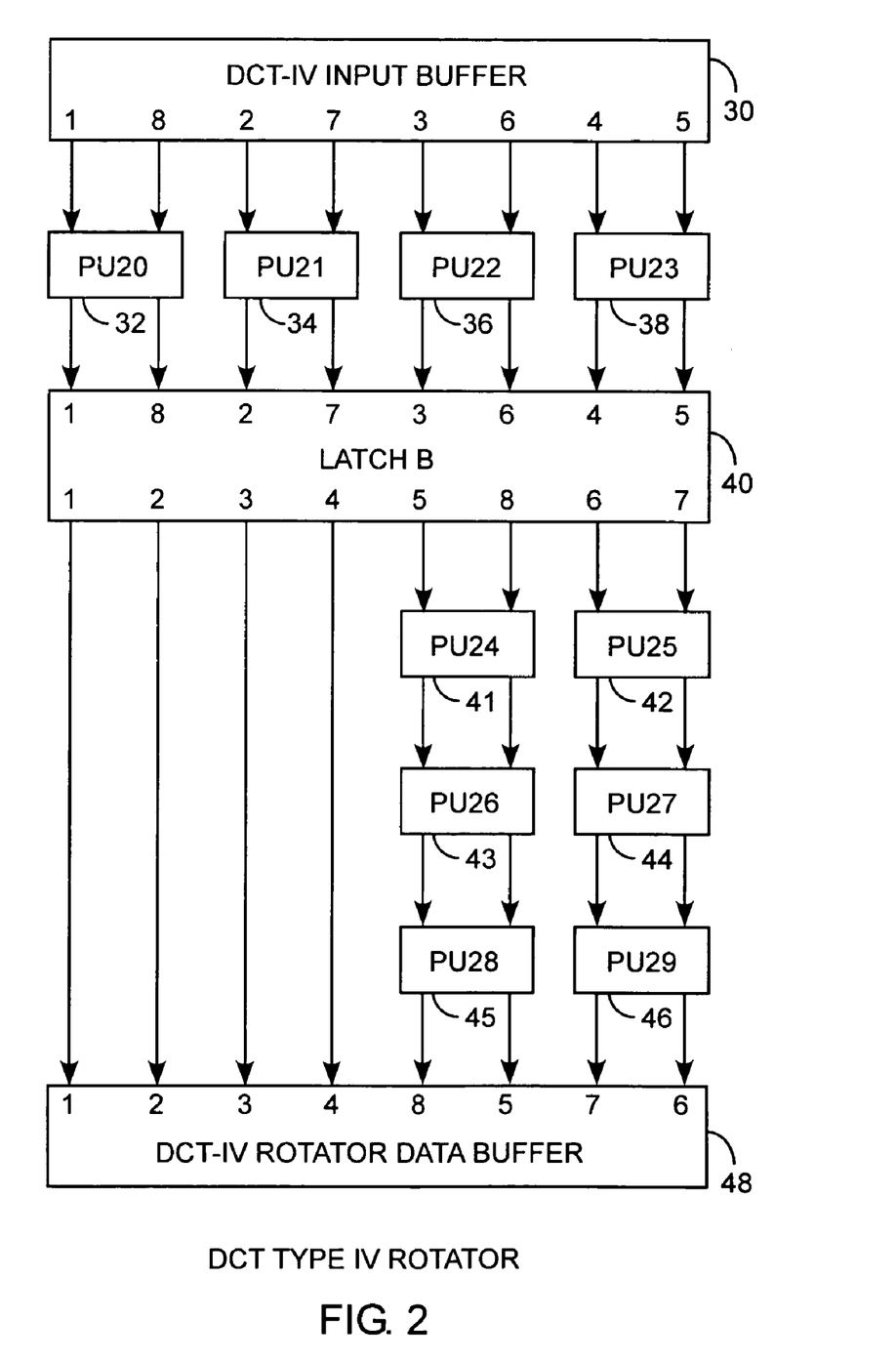
FIG. 2 is a block diagram of DCT type IV rotator.

Referring to FIG. 2, an input set of eight integer samples from the DCT-IV input buffer 30 is DCT-IV transformed and quantized data. FIG. 2 depicts the lossless implementation of the first two matrix factors comprising of $R_8$ and F. DCT data words one and eight are sent to processing unit PU20 32, DCT data words two and seven are sent to processing unit PU21 34, DCT data words three and six are sent to processing unit PU22 36, and DCT data words four and five to processing unit PU23 38. The processing units, PU20 32, PU21 34, PU22 36, and PU23 38 are lossless 2×2 rotators that each of the 2×2 lossless rotators comprises of three integer-to-integer lifting stages. Each of the processing units, PU20 32, PU21 34, PU22 36 and PU23 38 has a unique rotating angle. The rotating angle of PU20 32 is π/32 radians, of PU21 34 is π/16 radians, of PU22 36 is 3π/32 radians, and of PU23 38 is π/8 radians for π=3.14159 radians. The rotated outputs from PU20 32, PU21 34, PU22 36, and PU23 38, are latched on by latch B 40. The latch output words five and eight are sent to processing unit PU24 41, and the latch output words six and seven are sent to processing unit PU25 42. Both of the processing units, PU24 41 and PU25 42 are lossless 2×2 rotators that each of the lossless 2×2 rotators comprises of three integer-to-integer lifting stages. The rotated outputs from PU24 41 and PU25 42 are sent respectively to the next processing units, PU26 43 and PU27 44. Both of the processing units, PU26 43 and PU27 44 are 2×2 lossless rotators. The rotated outputs from PU26 43 and PU27 44 are again sent respectively to the next processing units, PU28 45 and PU29 46. Both of the processing units, PU28 45 and PU29 46 are 2×2 lossless rotators. Each of the PU24 41, PU25 42, PU26 43, PU27 44, PU28 45, and PU29 46 has a unique rotating angle. The rotating angle of PU24 41 is π/16 radians, of PU25 42 is 3π/16 radians, of PU26 43 is π/4 radians, of PU27 44 is π/4 radians, of PU28 45 is −π/16 radians, and PU29 46 is −3π/16 radians. The rotated outputs from PU28 45 are sent to the DCT-IV rotator data buffer 48 as output words eight and five. The rotated outputs from PU29 46 are sent to the DCT-IV rotator data buffer 48 as output words seven and six. The output words one, two, three, and four from latch B 40 are sent directly without further rotations to the DCT-IV rotator data buffer 48 as output words one, two, three, and four.

Each of the lossless 2×2 rotators comprises of three integer-to-integer lifting stages. The weights that are used for multiplication of inputs in an integer-to-integer three stage lifting lossless 2×2 rotator may be replaced by shift and add operations on the binary digits of the inputs to each lifting stage. The weights, sine and cosine of rotating angles, are stored in the read only memory (ROM) in canonic signed digit codes.

Figure 3:
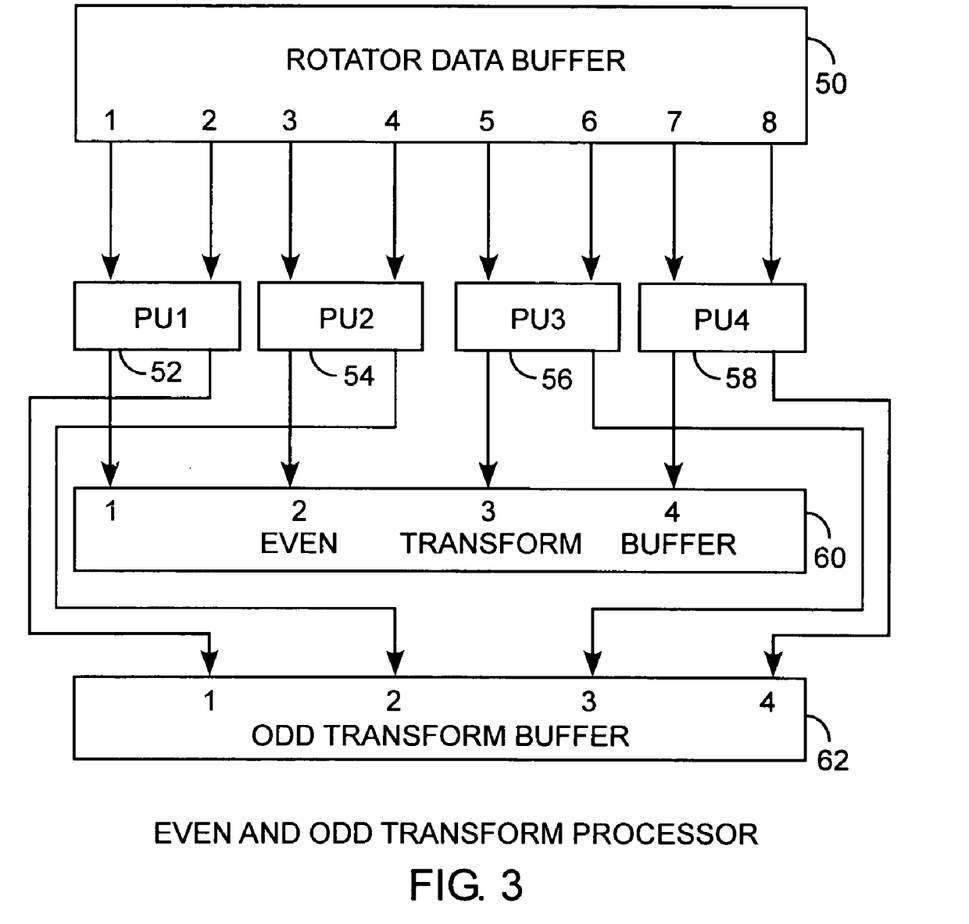
FIG. 3 is a block diagram of an even and odd transform processor.

Referring to FIG. 3, the input DCT data of eight data samples at rotator data buffer 50 are either rotated integer DCT-II transformed or rotated integer DCT-IV transformed data. Every pair of the input DCT data is sent to processing units, PU1 52, PU2 54, PU3 56, and PU4 58 for pair-wise additions and subtractions. Processing units PU1 52, PU2 54, PU3 56, and PU4 58 are identical 2×2 lossless rotators with 45 degree rotating angles at π/4 radians. The first integer outputs of PU1 52, PU2 54, PU3 56, and PU4 58 are the DCT transformed of even numbered integer spatial or time data, being stored at the even transform buffer 60. The second integer output of PU1 52, PU2 54, PU3 56, and PU4 58 are the DCT transformed of odd numbered integer spatial or time data, being stored at the odd transform buffer 62.

Each of the lossless 2×2 rotators in processing units PU1 52, PU2 54, PU3 56, and PU4 58 comprises of three integer-to-integer lifting stages. The weights that are used for multiplication of inputs in an integer-to-integer three stage lifting lossless 2×2 rotator may be replaced by shift and add operations on the binary digits of the inputs to each lifting stage. For binary shifts and additions, the weights, sine and cosine of rotating angles, are given by the canonic signed digit codes of $\sin(\pi/4)$ and $\cos(\pi/4)$.

The data stored in the even transform buffer 60 is the DCT-II of the even half input, $T(x_e)$, and the data stored in the odd transform buffer 62 is the DCT-II of the odd half input, $T(x_o)$. Both $T(x_e)$ and $T(x_o)$ were obtained from the quantized DCT-II coefficients z according to the DCT-II split equation.

$$\begin{bmatrix} T(x_e) \\ T(x_o) \end{bmatrix} = \frac{1}{\sqrt{2}} \begin{bmatrix} I & I \\ I & -I \end{bmatrix} \begin{bmatrix} I & 0 \\ 0 & F \end{bmatrix} R_8^t$$

In the DCT-II split equation F is a symmetric 4×4 matrix consisting of two pair-wise elementary rotators, with $c_k=\cos(k\pi/16)$ and $s_k=\sin(k\pi/16)$ for k=1, 2, 3 in an F matrix and $R_8$ matrix.

$$F = \begin{bmatrix} 0 & s_2 & 0 & c_2 \\ s_2 & 0 & c_2 & 0 \\ 0 & c_2 & 0 & -s_2 \\ c_2 & 0 & -s_2 & 0 \end{bmatrix}$$

-continued $$R_8 = \begin{bmatrix} 1 & 0 & 0 & 0 & 0 & 0 & 0 & 0 \\ 0 & c_1 & 0 & 0 & 0 & 0 & 0 & s_1 \\ 0 & 0 & c_2 & 0 & 0 & 0 & s_2 & 0 \\ 0 & 0 & 0 & c_3 & 0 & s_3 & 0 & 0 \\ 0 & 0 & 0 & 0 & 1 & 0 & 0 & 0 \\ 0 & 0 & 0 & -s_3 & 0 & c_3 & 0 & 0 \\ 0 & 0 & -s_2 & 0 & 0 & 0 & c_2 & 0 \\ 0 & -s_1 & 0 & 0 & 0 & 0 & 0 & c_1 \end{bmatrix}$$

FIG. 1 depicts the lossless implementation of the first two matrix factors comprising of $R_8$ and F. FIG. 3 depicts the lossless implementation of the third matrix factor comprising of four pairs of scaled sums and differences. Referring to FIGS. 2 and 3, the data stored in the even transform buffer 60 is the DCT-IV of the even half input, $D(x_e)$, and the data stored in the odd transform buffer 62 is the DCT-IV of the odd half input $D(x_o)$. Both $D(x_e)$ and $D(x_o)$ were obtained from the quantized DCT-IV coefficients z according to the DCT-IV split equation.

$$\begin{bmatrix} D(x_e) \\ D(x_o) \end{bmatrix} = \frac{1}{\sqrt{2}} \begin{bmatrix} I & I \\ I & -I \end{bmatrix} \begin{bmatrix} I & 0 \\ 0 & F \end{bmatrix} R_8^t$$

In the DCT-IV split equation F is a symmetric 4×4 matrix consisting of two pair-wise elementary rotators, as with $c_k=\cos(k\pi/32)$ and $s_k=\sin(k\pi/32)$ for k=1, 2, 3, 4, 5, 6 in F, $R_8$ and $R_4$ matrices.

$$F = \frac{1}{\sqrt{2}} R_4 \begin{bmatrix} 1 & 1 & & \\ 1 & -1 & & \\ & & 1 & 1 \\ & & 1 & -1 \end{bmatrix} R_4^t \rightarrow$$

$$R_8 = \begin{bmatrix} c_1 & 0 & 0 & 0 & 0 & 0 & 0 & s_1 \\ 0 & c_2 & 0 & 0 & 0 & 0 & s_2 & 0 \\ 0 & 0 & c_3 & 0 & 0 & s_3 & 0 & 0 \\ 0 & 0 & 0 & c_4 & s_4 & 0 & 0 & 0 \\ 0 & 0 & 0 & -s_4 & c_4 & 0 & 0 & 0 \\ 0 & 0 & -s_3 & 0 & 0 & c_3 & 0 & 0 \\ 0 & -s_2 & 0 & 0 & 0 & 0 & c_2 & 0 \\ -s_1 & 0 & 0 & 0 & 0 & 0 & 0 & c_1 \end{bmatrix}$$

$$R_4 = \begin{bmatrix} c_2 & 0 & 0 & s_2 \\ 0 & c_6 & s_6 & 0 \\ 0 & -s_6 & c_6 & 0 \\ -s_2 & 0 & 0 & c_2 \end{bmatrix}$$

Figure 4:
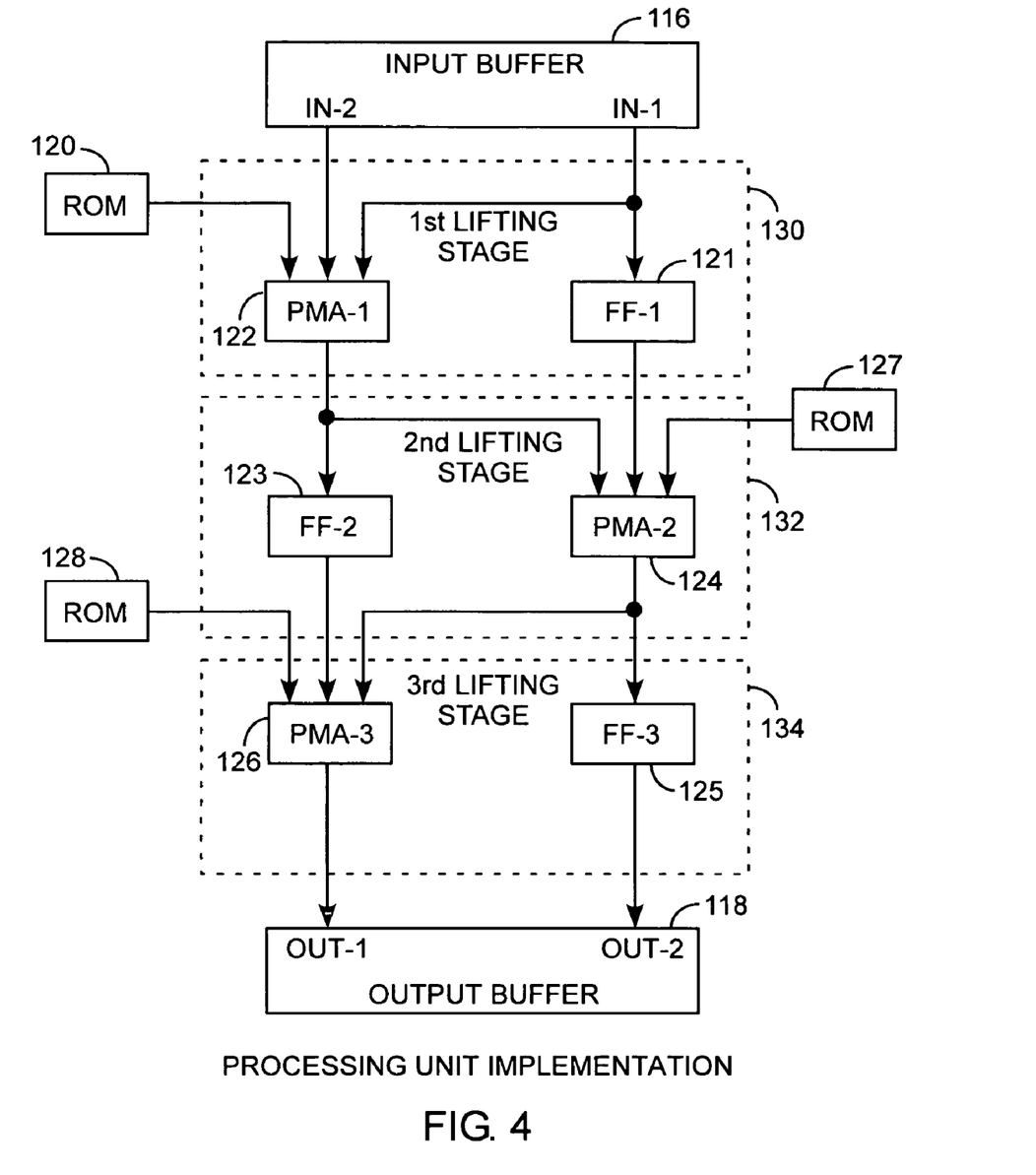
FIG. 4 is a schematic diagram of an implementation of a processing unit.

Referring to FIG. 4, the design of a lossless 2×2 rotator is based on a three-stage lifting transform comprising of three lifting stages, a first lifting stage 130, a second lifting stage 132, and a third lifting stage 134. The electronic circuit is a parallel pipeline with data flow arranged in word serial and bit parallel format. Three multiplying constants, p, c, and (−p), are respectively stored in ROM 120, ROM 127, and ROM 128 in canonic signed digital codes. The constant c is the cosine of the rotating angle. The constant p is equal to one minus the sine of the rotating angle divided by the cosine of the rotating angle. In two's complement, the first input data IN-1 from the input buffer 116 is multiplied to the canonic signed digit codes of p in ROM 120 by the first pipelined multiply-add unit PMA-1 122 in the lifting stage A 130. In the same PMA-1 122 unit the multiplied result is added to the second input data IN-2 from the input buffer 116 in two's complement form. The pipelined multiply-add unit, composing of many levels of arrays of carry and save adders, and an array of carry look-ahead adders with an output latch at the output end of the pipelined multiply-add unit (PMA), performs array multiplications and additions in the same unit. The number of pipelined multiply-add unit levels depends on the bit length of each data involved in multiplication and addition operations. At the same time instant that PMA-1 122 begins processing, the first latch FF-1 121 latches on the first input IN-1. A common data ready signal is used to delatch the PMA-1 122 latch and the FF-1 121 latch, so that both outputs from PMA-1 122 and FF-1 121 can simultaneously flow to the second lifting stage 132. The output from PMA-1 122 is multiplied to the canonic signed digit codes of c in ROM 127 by the second pipelined multiply-add unit PMA-2 124 in the second lifting stage 132. In the same PMA-2 124 unit the multiplied result subtracts the output of FF-1 121 in two's complement form. At the same time instant that PMA-2 124 begins processing, the second latch FF-2 123 latches on the output of PMA-1 123. A common data ready signal is used to delatch the PMA-2 124 latch and the FF-2 123 latch, so that both outputs from PMA-2 124 and FF-2 123 can simultaneously flow to the third lifting stage 134. The output from PMA-2 124 is multiplied to the canonic signed digit codes of (−p) in ROM 128 by the third pipelined multiply-add unit PMA-3 126 in the third lifting stage 134. In the same PMA-3 126 unit, the multiplied result is added to the output of FF-2 123 in two's complement form. At the same time instant that PMA-3 126 begins processing, the third latch FF-3 125 latches on the output of PMA-2 124. A common data ready signal is used to delatch the PMA-3 126 latch and the FF-3 125 latch, so that both outputs from PMA-3 126 and FF-3 125 can simultaneously flow to the output buffer 118. The output from PMA-3 126 is the OUT-1 in the output buffer 118. The output from FF-3 125 is the OUT-2 in the output buffer 118.

Figure 5:
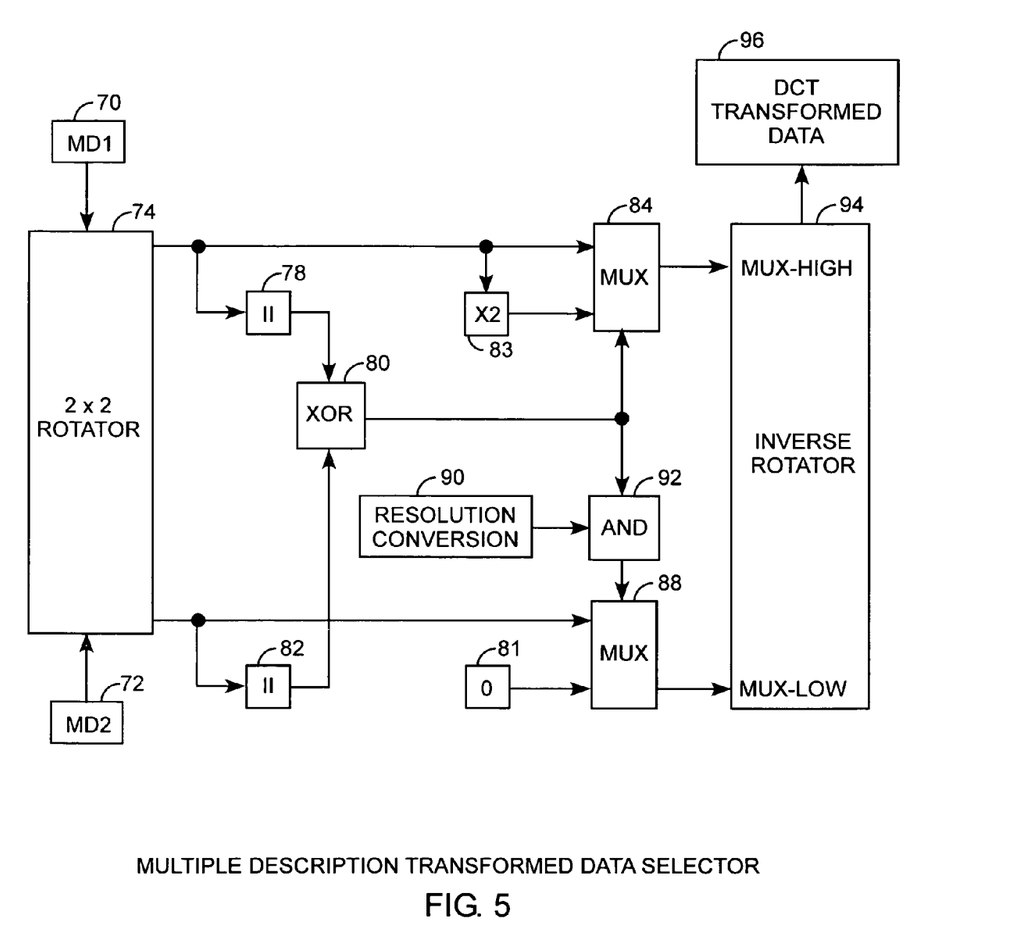
FIG. 5 is a block diagram of a multiple description transformed data selector.

Referring to FIG. 5, the first input MD1 70 is the integer DCT transformed data of even numbered spatial or time data words. The second input MD2 72 is the integer DCT transformed data words of odd numbered spatial or time data. MD1 70 and MD2 72 are inputs to a 2×2 lossless rotator 74 with 45 degrees rotating angle at $\pi/4$ radians. The lossless 2×2 rotator 74 comprises of three integer-to-integer lifting stages. The first output of the lossless 2×2 rotator, the scaled sum, is the integer round-offs of (MD1+MD2) divided by the square root of two. The second output of the lossless 2×2 rotator, the scaled difference, is the integer round-offs of (MD1−MD2) divided by the square root of two. The absolute value of the scaled sum obtained from the magnitude unit 78 and the absolute value of the scaled difference obtained from the magnitude unit 82 are compared at the comparator XOR 80. The output of comparator XOR 80 is a binary zero when MD1 70 or MD2 72 or both are missing. The output of comparator XOR 80 is a binary one when both MD1 70 and MD2 72 are present. In the latter case, with the output of the resolution conversion 90 being one also, both the scaled sum and the scaled difference pass through the respective multiplexer 84 and multiplexer 88 to the input Mux-High and the input Mux-Low of the inverse rotator 94. In the same latter case, when the output of the resolution conversion 90 is zero and the output of AND 92 becomes one, only the scaled sum is passed on to a mux-high data and zero value from ROM 81 is passed on to mux-low data. When the output of comparator XOR 80 is zero, when MD2 72 is missing and MD1 70 is present, the first input mux-high to the inverse rotator 94 is two times the scaled sum because of the shifting up of one bit by an X2 multiplier 83, and the second input mux-low to the inverse rotator 94 is always zero because of zero value inputting to the multiplexer 88 from ROM 81 while disregarding the output value of the resolution conversion 90 as the AND 92 output becomes zero. When the output of comparator XOR 80 is zero, when MD1 70 is missing and MD2 72 is present, the first input mux-high to the inverse rotator 94 is two times the scaled sum and the second input mux-low to the inverse rotator 94 is always zero while disregarding the output value of the resolution conversion 94 as the AND 92 output becomes zero. The process of the inverse rotator 94 is to perform the inverse function of the DCT rotator. The output of the inverse rotator, DCT transformed data 96, is the recovered DCT data. The DCT data is perfectly recovered when both inputs, MD1 70 and MD2 72 are received without errors. Otherwise, a low-resolution version of the DCT data is reconstructed back when either one of the inputs, MD1 70 and MD2 72, is missing, when the output of the resolution conversion 90 is set to zero.

The output of the comparator XOR 80 is always one when both inputs, MD1 70 and MD2 72, are received without loss. For DCT-II data, $T(x_e)$ is the input MD1 70 and $T(x_o)$ is the input MD2 72. Setting the output of the resolution conversion 90 into one implies that there is no requirement for resolution down conversion. In such a case, the quantized DCT-II data are perfectly recovered from the input MD1 70 and MD2 72 according to the DCT-II merge equation.

$$z = \frac{1}{\sqrt{2}} R_8 \begin{bmatrix} I & 0 \\ 0 & F \end{bmatrix} \begin{bmatrix} I & I \\ I & -I \end{bmatrix} \begin{bmatrix} T(x_e) \\ T(x_o) \end{bmatrix}$$

The lossless 2×2 rotator 74 is the lossless implementation of the first matrix factor comprising four pairs of scaled sums and differences in the DCT-II merge equation. The inverse rotator 94 is the lossless implementation of the next two matrix factors comprising F and $R_8$ in the DCT-II merge equation.

The output of comparator XOR 80 is always 1 when both inputs, MD1 70 and MD2 72, are received without loss. For DCT-IV data, $D(x_e)$ is the input MD1 70 and $D(x_o)$ is the input MD2 72. Setting the output of the resolution conversion 90 into 1 implies that there is no requirement for resolution down conversion. In such a case, the quantized DCT-IV data are perfectly recovered from the input MD1 70 and MD2 72 according to the DCT-IV merge equation.

$$z = \frac{1}{\sqrt{2}} R_8 \begin{bmatrix} I & 0 \\ 0 & F \end{bmatrix} \begin{bmatrix} I & I \\ I & -I \end{bmatrix} \begin{bmatrix} D(x_e) \\ D(x_o) \end{bmatrix}$$

The lossless 2×2 rotator 74 is the lossless implementation of the first matrix factor comprising four pairs of scaled sums and differences in the DCT-IV merge equation. The inverse rotator 94 is the lossless implementation of the next two matrix factors comprising F and $R_8$ in the DCT-IV merge equation.

When one of the MD1 70 and MD2 72 is lost during transmission while disregarding the value of the output of the resolution conversion 90, a low-resolution reconstruction of the original spatial or time data is realized by passing the two times the scaled sum 82 to the inverse rotator 94. The two times value the scaled sum is equal to square root of two times one of the survived inputs MD1 70 or MD2 72 denoted by T(x). The inverse rotator 94 then reconstructs a low-resolution version of the original spatial or time data according to the reconstruction equation.

$$z = R_8 \begin{bmatrix} I & 0 \\ 0 & F \end{bmatrix} \begin{bmatrix} \sqrt{2} T(x) \\ 0 \end{bmatrix}$$

When the output of the resolution conversion 90 is set to zero disregarding the present of both MD1 70 and MD2 72 inputs, a low-resolution reconstruction of the original spatial or time data is realized by passing the scaled sum, S(x) to the Mux-High of the inverse rotator 94 and by passing zero to the Mux-Low of the inverse rotator 94. The inverse rotator 94 then reconstructs a low-resolution version of the original spatial or time data according to the resolution down conversion equation.

$$z = R_8 \begin{bmatrix} I & 0 \\ 0 & F \end{bmatrix} \begin{bmatrix} S(x) \\ 0 \end{bmatrix}$$

Referring to all Figures, no extra redundancies are needed to add to the DCT compressed data because the even and odd halves of the original spatial or time data are highly correlated, and so are the respective DCTs. The correlation allows for the use of only one MD data stream to reconstruct a low-resolution version of the original DCT data. It should be apparent that the transforms as shown have input and output buffers and communication lines for communicating input data and output data. The transforms are useful in data compression that conserves storage capacities and communication bandwidth such that the invention can be used in computer systems and communication systems. Those skilled in the art can make enhancements, improvements, and modifications to the invention, and these enhancements, improvements, and modifications may nonetheless fall within the spirit and scope of the following claims.

What is claimed is:

1. A data compression system for splitting input DCT (Discrete Cosine Transform) transform data into transformed data halves, the system for use in data storage and data communications, the system comprising, a plurality of communication lines operable to couple a plurality of process units to a buffer, the plurality of process units adapted to implement at least portions of a rotator and a splitter, the rotator for rotating the input DCT transform data into rotated transformed data, and the splitter comprising process units for splitting the rotated transformed data into transformed data halves of odd transformed data and even transformed data, the process units being rotators having the same rotation angle, each of the rotators provides odd transform data and even transform data of the transformed data halves, the transformed data halves being lossless transform data.

2. The system of claim 1 wherein, the DCT transform data provides bit-parallel serial words, and the rotation angle is π/4 radians.

3. The system of claim 1 wherein,
each of the process units is a 2×2 rotator having two bit-parallel serial word inputs $X_1$ and $X_2$ of the input DCT transformed data that are rotated by an angle θ in radians into two outputs $Y_1$ and $Y_2$ where $Y_1 = \cos\theta X_1 + \sin\theta X_2$ and $Y_2 = -\sin\theta X_1 + \cos\theta X_2$.

4. The system of claim 1 further comprises,
a merger for receiving and merging at least one of the transformed data halves and providing merged DCT transformed data.

5. The system of claim 1 wherein the rotator is a DCT-II rotator comprising,
an input buffer for receiving DCT-II transform data being eight input words,
three process units for rotating the eight input words into rotated words one through eight, a first one of the three process units being a rotator for rotating input words two and eight by π/16 radians into first rotated words two and eight, a second one of the three process units being a rotator for rotating input words three and seven by π/8 radians into first rotated words three and seven, a third one of the three process units being a rotator for rotating input words four and six by 3π/16 radians into first rotated words four and six, input words one and five being unrotated as first rotated words one and five,
a latch for latching and permuting the eight first rotated words into eight latched words one through eight by permuting the first rotated words one, two, eight, three, seven, four, six, and five into latched words one, two, three, four, six, eight, five, and seven, and
two process units for rotating four of the latched words, a first one of the two process units being a rotator for rotating latched words six and eight by π/8 radians into second rotated words seven and five of the rotated transformed data, a second one of two process units being a rotator for rotating latched words five and seven by π/8 radians into second rotated words eight and six of the rotated transformed data, latched words one, two, three, and four being unrotated as words one, two, three, and four of the rotated transformed data.

6. The system of claim 1 wherein the rotator is a DCT-IV rotator comprising,
an input buffer for receiving the DCT-IV transform data being eight input words,
four process units for rotating the eight input words into eight first rotated words, a first one of the four process units being a rotator for rotating input words one and eight by π/32 radians into first rotated words one and eight, a second one of the four process units being a rotator for rotating input words two and seven by π/16 radians into first rotated words two and seven, a third one of the four process units being a rotator for rotating input words three and six by 3π/32 radians into first rotated words three and six, a fourth one of the four process units being a rotator for rotating input words four and five by π/8 radians into first rotated words four and five,
a latch for permuting the first rotated words one, eight, two, seven, three, six, four, and five into latched words one, two, three, four, five, eight, six, and seven, respectively, and
six process units, a first three of the six process units being a first set of three rotators, a first rotator of the first set of three rotators for rotating latched words five and eight by π/16 radians into two outputs rotated by a second rotator of the first set of rotators for rotating by π/4 radians into two outputs rotated by a third rotator of the first set of rotators rotating by −π/16 into second rotated words eight and five of the rotated transformed data, a second three of the six process units also being a second set of three rotators, a first rotator of the second set of rotators for rotating latched words six and seven by 3π/16 radians into two outputs rotated by a second rotator of the second set for rotating by π/4 radians into two more outputs rotated by a third rotator of the second set for rotating −3π/16 into words seven and six of the rotated transformed data, with latched words one, two, three, and four being unrotated as words one, two, three and four of the rotated transformed data, respectively.

7. A data compression system for splitting and merging input DCT (Discrete Cosine Transform) transform data into transformed data halves, the system for use in data storage and data communication, the system comprising,
a plurality of communication lines operable to couple a plurality of process units to a buffer,
the plurality of process units adapted to implement at least portions of a rotator and a splitter,
the rotator for rotating the input DCT transform data into rotated transformed data,
the splitter comprising process units for splitting the rotated transformed data into transformed data halves of odd transformed data and even transformed data, each of the rotators provides odd transform data and even transform data of the transformed data halves, the transformed data halves being lossless transform data, and
a merger for merging and receiving at least one of the transformed data halves and providing merged DCT transformed data.

8. The system of claim 7 wherein,
the process units being rotators having the same rotation angle.

9. The system of claim 7 wherein,
the merger receives both transformed data halves, and
the merged DCT transformed data is lossless merged DCT transformed data being the input DCT transform data.

10. The system of claim 7 further comprises
the merger receives at least one of the transformed data halves and providing merged DCT transformed data, the merger receiving both transformed data halves, the merged DCT transformed data being lossless merged DCT transformed data being the input DCT transform data, the merged DCT transform data comprising high-resolution data.

11. The system of claim 7 wherein,
the merger determines the presence of both of the transformed data halves, and
the merger merges the transform data halves into the merged DCT transformed data when both of the transform data halves are present.

12. The system of claim 7 wherein,
the merger determines when only one the of the transformed data halves is present, and
the merger merges the present transform data halve with null values for merging the present transform data halve into the merged DCT transformed data comprising low-resolution data.

13. The system of claim 7 wherein,
the merger received only one of the transformed data halves, and
the merged DCT transformed data is lossy merged DCT transformed data.

14. The system of claim 7 wherein,
the merger received only one of the transformed data halves, the merged DCT transformed data is lossy merged DCT transformed data, and the merged DCT transformed data comprises low-resolution data.

15. The system of claim 7 wherein, the DCT transform data is DCT domain data, and the rotated transformed data is DCT domain data.

16. A system for splitting input DCT Discrete Cosine Transform) transform data into transformed data halves, the system comprising, a plurality of communication lines operable to couple a plurality of process units to a buffer, the plurality of process units adapted to implement at least portions of a rotator and a splitter, the rotator for rotating the input DCT transform data into rotated transformed data, and the splitter comprising process units for splitting the rotated transformed data into transformed data halves of odd transformed data and even transformed data, the process units being rotators having the same rotation angle, each of the rotators provides odd transform data and even transform data of the transformed data halves, the transformed data halves being lossless transform data, wherein the rotator is a DCT-II rotator comprising, an input buffer for receiving DCT-II transform data being eight input words, three process units for rotating the eight input words into rotated words one through eight, a first one of the three process units being a rotator for rotating input words two and eight by $\pi/16$ radians into first rotated words two and eight, a second one of the three process units being a rotator for rotating input words three and seven by $\pi/8$ radians into first rotated words three and seven, a third one of the three process units being a rotator for rotating input words four and six by $3\pi/16$ radians into first rotated words four and six, input words one and five being unrotated as first rotated words one and five, a latch for latching and permuting the eight first rotated words into eight latched words one through eight by permuting the first rotated words one, two, eight, three, seven, four, six, and five into latched words one, two, three, four, six, eight, five, and seven, and two process units for rotating four of the latched words, a first one of the two process units being a rotator for rotating latched words six and eight by $\pi/8$ radians into second rotated words seven and five of the rotated transformed data, a second one of two process units being a rotator for rotating latched words five and seven by $\pi/8$ radians into second rotated words eight and six of the rotated transformed data, latched words one, two, three, and four being unrotated as words one, two, three, and four of the rotated transformed data.

17. A system for splitting input DCT Discrete Cosine Transform) transform data into transformed data halves, the system comprising, a plurality of communication lines operable to couple a plurality of process units to a buffer, the plurality of process units adapted to implement at least portions of a rotator and a splitter, the rotator for rotating the input DCT transform data into rotated transformed data, and the splitter comprising process units for splitting the rotated transformed data into transformed data halves of odd transformed data and even transformed data, the process units being rotators having the same rotation angle, each of the rotators provides odd transform data and even transform data of the transformed data halves, the transformed data halves being lossless transform data, wherein the rotator is a DCT-IV rotator comprising, an input buffer for receiving the DCT-IV transform data being eight input words, four process units for rotating the eight input words into eight first rotated words, a first one of the four process units being a rotator for rotating input words one and eight by $\pi/32$ radians into first rotated words one and eight, a second one of the four process units being a rotator for rotating input words two and seven by $\pi/16$ radians into first rotated words two and seven, a third one of the four process units being a rotator for rotating input words three and six by $3\pi/32$ radians into first rotated words three and six, a fourth one of the four process units being a rotator for rotating input words four and five by $\pi/8$ radians into first rotated words four and five, a latch for permuting the first rotated words one, eight, two, seven, three, six, four, and five into latched words one, two, three, four, five, eight, six, and seven, respectively, and six process units, a first three of the six process units being a first set of three rotators, a first rotator of the first set of three rotators for rotating latched words five and eight by $\pi/16$ radians into two outputs rotated by a second rotator of the first set of rotators for rotating by $\pi/4$ radians into two outputs rotated by a third rotator of the first set of rotators rotating by $-\pi/16$ into second rotated words eight and five of the rotated transformed data, a second three of the six process units also being a second set of three rotators, a first rotator of the second set of rotators for rotating latched words six and seven by $3\pi/16$ radians into two outputs rotated by a second rotator of the second set for rotating by $\pi/4$ radians into two more outputs rotated by a third rotator of the second set for rotating $-3\pi/16$ into words seven and six of the rotated transformed data, with latched words one, two, three, and four being unrotated as words one, two, three, and four of the rotated transformed data, respectively.

* * * * *